United States Patent
Belcsik et al.

(10) Patent No.: US 10,402,072 B2
(45) Date of Patent: Sep. 3, 2019

(54) PREDICTIVE BACKGROUND UPDATING

(71) Applicant: GRAPHISOFT, Budapest (HU)

(72) Inventors: András Belcsik, Budapest (HU); Gyula Faller, Dunakeszi (HU)

(73) Assignee: GRAPHISOFT SE, Budapest (HU)

( * ) Notice: Subject to any disclaimer, the term of this patent is extended or adjusted under 35 U.S.C. 154(b) by 654 days.

(21) Appl. No.: 14/703,655

(22) Filed: May 4, 2015

(65) Prior Publication Data

US 2016/0328131 A1    Nov. 10, 2016

(51) Int. Cl.

| G06F 3/0484 | (2013.01) |
| G06F 3/0481 | (2013.01) |
| G06T 19/20 | (2011.01) |
| G06F 12/0875 | (2016.01) |
| G06T 17/05 | (2011.01) |

(52) U.S. Cl.
CPC ...... *G06F 3/04847* (2013.01); *G06F 3/04815* (2013.01); *G06F 12/0875* (2013.01); *G06T 17/05* (2013.01); *G06T 19/20* (2013.01); *G06F 2212/455* (2013.01)

(58) Field of Classification Search
CPC ..... G06T 19/20; G06T 17/05; G06F 3/04815; G06F 12/0875
See application file for complete search history.

(56) References Cited

U.S. PATENT DOCUMENTS

| 5,307,451 | A | * | 4/1994 | Clark | G06T 11/001 |
| | | | | | 345/427 |
| 5,995,107 | A | * | 11/1999 | Berteig | G06T 19/20 |
| | | | | | 345/420 |
| 8,436,851 | B2 | * | 5/2013 | Hoffman | G06T 15/005 |
| | | | | | 345/419 |
| 9,020,783 | B2 | * | 4/2015 | Narayan | G06F 17/5009 |
| | | | | | 345/594 |
| 2004/0098151 | A1 | * | 5/2004 | Carlucci | G06F 17/50 |
| | | | | | 700/95 |
| 2007/0179759 | A1 | * | 8/2007 | Mangon | G06F 17/5004 |
| | | | | | 703/1 |
| 2008/0140937 | A1 | * | 6/2008 | Nalawade | G06F 12/0871 |
| | | | | | 711/119 |
| 2010/0077185 | A1 | * | 3/2010 | Gopalan | G06F 9/5033 |
| | | | | | 712/220 |
| 2011/0067029 | A1 | * | 3/2011 | Wolfe | G06F 9/505 |
| | | | | | 718/102 |
| 2011/0247006 | A1 | * | 10/2011 | Kim | G06F 9/5033 |
| | | | | | 718/105 |
| 2012/0310906 | A1 | * | 12/2012 | Miller | G06Q 10/06 |
| | | | | | 707/695 |
| 2014/0040556 | A1 | * | 2/2014 | Walker | G06F 9/5016 |
| | | | | | 711/130 |
| 2015/0278984 | A1 | * | 10/2015 | Koker | G06T 1/60 |
| | | | | | 345/557 |

* cited by examiner

*Primary Examiner* — Mandrita Brahmachari
*Assistant Examiner* — Bille M Dahir
(74) *Attorney, Agent, or Firm* — Jackson Walker LLP; Christopher J. Rourk; Thomas B. Hayes (57) ABSTRACT

Predictive background updating is disclosed, which takes advantage of a processors' unused capacity to build up live model views in advance. Open model views of the project can be continuously updated in the background. In this manner, changing model views is implemented more rapidly, regardless of the size and complexity of the BIM model, such as when the view updates in the background have finished prior to the change in views.

20 Claims, 2 Drawing Sheets

PREDICTIVE BACKGROUND UPDATING

TECHNICAL FIELD

The present disclosure relates generally to building modeling tools, and more specifically to a system and method for predictive background updating that utilizes unused processing capacity to improve building modeling.

BACKGROUND OF THE INVENTION

Systems for modeling buildings typically include elevation views, layout views and 3D views, among others. These building modeling systems are processor intensive and are often slow to implement changes made by a user in one view when the user switches to a different view.

SUMMARY OF THE INVENTION

A system for modeling buildings is provided that includes a building view system operating on a multi-processor system that is configured to allow a user to select one of a plurality of building modeling views, such as an elevation view or a plan/section view, and to create and edit building components in each of the building modeling views. A cache system generates changes from the selected building modeling view, such as the section view, in another one of the plurality of building modeling views, such as the elevation view, using available capacity of one or more processors of the multi-processor system, wherein the changes are generated while the selected building modeling view, such as the section view, is active and the other one of the plurality of building modeling views, such as the elevation view, is inactive.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Building information modeling (BIM) tools include floor plan modeling tools, elevation modeling tools, 3D drawing modeling tools, 3D documents, interior elevations and other suitable tools, which are typically coordinated at some level. A user can usually work on one model view, and the changes made by the user are then updated to the other model views when the user is finished. However, the changes made by the user in the selected model view must then be implemented in the other model views, which can result in significant delays. In order to avoid these delays, predictive background updating can be used as disclosed herein to implement changes to the other model views in the background while a user is editing a model in an active window.

Predictive background updating can take advantage of unused processor capacity to implement changes to other model views and to cache those changes for rapid implementation when the user changes views. In one exemplary embodiment, all open model views of the project can be continuously updated in the background using unused processor capacity, so as to allow view updates to occur in the background. If the view updates finish prior to changing an active window to that view, then the changing model view will be implemented nearly instantaneously, regardless of the size and complexity of the BIM model.

In one exemplary embodiment, the building modeling system can save a common cache for a boundary representation (BREP) of BIM elements, and can also utilize a separate visualization cache for each open 3D based model view (such as section views, elevation views, 3D views, 3D documents, interior elevations, floor plans, schedules). When a user is working in a view to implement changes to the model through that view, the caches associated with the other model views can be continuously updated as a function of the user's element inputs and processor capacity. These caches can be continuously synchronized in the background, so as to provide a rapid transition when a user changes to a different view.

Furthermore, when there are a plurality of processor cores available, synchronization can be used to take full advantage of multiprocessing in the background. In one exemplary embodiment, a different thread can be used to update a cache for each different processor core, threads can be dynamically assigned to processor cores as a function of loading on the processor code, threads can be dynamically assigned to processor cores as a function of loading on the processor core and loading associated with the thread, or other suitable processes can also or alternatively be used. In this manner, the background synchronization of the caches does not interfere with user interactions in the active window. The order of the synchronization can follow the order of the last recently used views/viewpoints, a priority selected by the user, a default priority, a priority based on processor capacity required to update a view or other suitable priority selection processes can also or alternatively be used. Synchronization can be performed in small portions (jobs) and the caches can be incrementally built up from these portions. If a time-intensive synchronization process is interrupted during implementation by a user interaction, the model update that has been created in the cache can be saved, where only unfinished portions are discarded. The partial model update is stored outside of the cache memory and is thus ready to be processed further later on. The cache memory data structures can also be saved in non-cache memory, such as when a user stops work on a model without saving or if the user can shut down work without closing all windows and can start work again with all windows, so that next time the user opens the project, navigation between different views is not interrupted.

Predictive background update takes advantage of the processors' unused capacity to build up live model views in advance. All open model views of the project can be continuously updated in the background. If the view updates in the background had enough time to finish, a change to a different model view can be implemented in a faster time frame, without regard to the size and complexity of the BIM model.

Background update of multiple views of the BIM can be performed while a user is working on one view of the BIM in an active window, and all the other opened and/or unopened views of the same BIM can be continuously updated in the background without interfering with the user's actions. The underlying technology that enables the background view updates is a multi-level, BIM element-based caching system, which saves a common cache for BREP of BIM elements and a separate visualization cache for each open and/or open and closed 3D based model view (sections, elevations, 3D views, 3D documents, interior elevations, floor plans, schedules). When working in a view, the caches can be continuously updated based on the user's 3D element inputs.

The different views can refer to their relevant BIM elements in the common BREP cache. In this manner, the common BREP cache elements can be shared among the views, which results in a significant savings in time and memory usage. Several representations of a BIM element are stored in the BREP cache based on the different model view options. These are retained even when no views refer to them any longer, to allow them to be reused if the user changes back to the relevant model view option. The number of the retained representations can be predetermined, based on a user-selected configuration or otherwise selected.

The smart caching system of the present disclosure can take full advantage of multiple processors of a computer system. One processor can be reserved for handling user interactions, while processes for updating the different views can be distributed among the other available processors. In one exemplary embodiment, the following rules can be used to control how the background updates are carried out. First, only the views which are open in an application window can be updated. Second, the update can proceed from a first view to a second view, by making sure that the first view is always fully updated before the second view update is started. The order of the updates can follow the order of the last recently used views/viewpoints.

Figure 1:
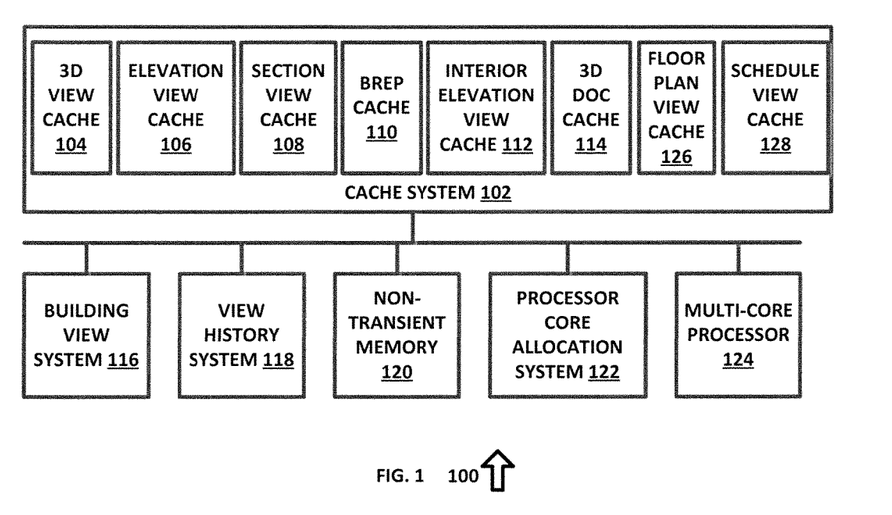
FIG. 1 is a diagram of a system for predictive background updating, in accordance with an exemplary embodiment of the present disclosure.

FIG. 1 is a diagram of a system 100 for predictive background updating, in accordance with an exemplary embodiment of the present disclosure. System 100 includes cache system 102, which includes 3D view cache 104, elevation view cache 106, section view cache 108, BREP cache 110, interior elevation view cache 112, 3D document cache 114, building view system 116, view history system 118, non-transient memory 120, processor core allocation system 122 and multi-core processor 124, each of which can be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Cache system 102 includes one or more non-transient memory devices, such as solid state memory devices or other suitable memory devices, which are configured to store data in conjunction with a 3D building modeling system. In one exemplary embodiment, the 3D modeling system can be implemented using a multi-core processing system, which includes dynamic and static memory. For example, the dynamic memory can be associated with each processor core, can be dynamically assigned to processor cores as a function of workload on each processor core, or can otherwise be used to support the operation of the multi-core processing system. Cache system 102 is typically used to store code that is loaded for execution by the processor, interim mathematical calculation results and other data that is not stored for future retrieval. In addition, cache system 102 can be configured to have sub-cache allocations, where the sub-cache sections are dedicated for currently executing processes on the multi-core processor. Cache system 102 can also transfer data between dynamic memory and static memory, such as non-transient memory 120, so as to transfer model cache memory from dynamic to static data storage devices when a user shuts down a building modeling system, to load model cache memory from static to dynamic data storage devices when a user activates a building modeling system or in other suitable manners.

3D view cache 104 is a dedicated cache memory space for use by a 3D modeling system. 3D view cache 104 can be allocated in cache system 102 at startup, such as based on a predetermined cache allocation for the 3D modeling system, a dynamic cache allocation for predetermined system types, or in other suitable manners. In this manner, 3D view cache 104 can have a size that is dynamically adjusted, fixed, or otherwise controlled. Likewise, 3D view cache 104 can be de-allocated when a 3D modeling system is closed, has not been activated or is otherwise not in use.

BREP cache 110 a common cache for boundary representations of BIM elements, which is configured to allow the BIM elements to be used by different view modeling systems and their associated caches, such as 3D view cache 104, elevation view cache 106, section view cache 108, interior elevation view cache 112, 3D document cache 114 and other suitable systems and components. BREP cache 110 can be allocated in cache system 102 at startup, such as based on a predetermined cache allocation for the BREP model, a dynamic cache allocation for predetermined system types, or in other suitable manners. In this manner, BREP cache 110 can have a size that is dynamically adjusted, fixed, or otherwise controlled. Likewise, BREP cache 110 can be de-allocated when a section modeling system is closed, has not been activated or is otherwise not in use.

Elevation view cache 106 is a dedicated cache memory space for use by an elevation modeling system. Elevation view cache 106 can be allocated in cache system 102 at startup, such as based on a predetermined cache allocation for the elevation modeling system, a dynamic cache allocation for predetermined system types, or in other suitable manners. In this manner, elevation view cache 106 can have a size that is dynamically adjusted, fixed, or otherwise controlled. Likewise, elevation view cache 106 can be de-allocated when an elevation modeling system is closed, has not been activated or is otherwise not in use.

Section view cache 108 is a dedicated cache memory space for use by a section modeling system. Section view cache 108 can be allocated in cache system 102 at startup, such as based on a predetermined cache allocation for the section modeling system, a dynamic cache allocation for predetermined system types, or in other suitable manners. In this manner, section view cache 108 can have a size that is dynamically adjusted, fixed, or otherwise controlled. Likewise, section view cache 108 can be de-allocated when a section modeling system is closed, has not been activated or is otherwise not in use.

Interior elevation view cache 112 is a dedicated cache memory space for use by an interior elevation modeling system. Interior elevation view cache 112 can be allocated in cache system 102 at startup, such as based on a predetermined cache allocation for the interior elevation view modeling system, a dynamic cache allocation for predetermined system types, or in other suitable manners. In this manner, interior elevation view cache 112 can have a size that is dynamically adjusted, fixed, or otherwise controlled. Likewise, interior elevation view cache 112 can be de-allocated when an interior elevation modeling system is closed, has not been activated or is otherwise not in use.

3D document cache 114 is a dedicated cache memory space for use by a 3D document modeling system. 3D document cache 114 can be allocated in cache system 102 at startup, such as based on a predetermined cache allocation for the 3D document system, a dynamic cache allocation for predetermined system types, or in other suitable manners. In this manner, 3D document cache 114 can have a size that is dynamically adjusted, fixed, or otherwise controlled. Likewise, 3D document cache 114 can be de-allocated when a 3D document system is closed, has not been activated or is otherwise not in use.

Building view system 116 provides a user interface for a selected modeling system, such as a 3D view modeling system, an elevation view modeling system, a section view modeling system, an interior elevation view modeling system, a 3D document modeling system or other suitable modeling systems. In one exemplary embodiment, building view system 116 can activate a new window for use by each modeling system, can load code into an operating system memory space for activation, can allocate cache memory for each modeling system and can perform other suitable functions.

View history system 118 tracks the usage history for different model views, such as to allow a cache model for the most recent view to be updated first, to allocate processor threads or for other suitable purposes. In one exemplary embodiment, view history system 118 can use a state machine or other suitable processing mechanisms to track the most recent prior view modeling system that was activated, the second most recent prior view modeling system that was activated and so on, to allow updates for the most recent view to be processed and stored in a dedicated cache for that modeling system.

Non-transient memory 120 is used for long-term data storage in a non-transient data memory device, such as a magnetic data storage device, a solid state data storage device, an optical data storage device or other suitable data storage devices. In one exemplary embodiment, non-transient memory 120 can store program data for modeling programs, cache data associated with each modeling program or other suitable data.

Processor core allocation system 122 controls allocation of processor cores in multi-core processor 124, such as by activating one or more threads for each of a plurality of different view modeling systems, such as a 3D view modeling system, an elevation view modeling system, a section view modeling system, an interior elevation view modeling system a 3D document modeling system or other suitable modeling systems. In one exemplary embodiment, processor core allocation system 122 monitors multi-core processor 124 to determine core processing capacity, and allocates background view model processing and cache storage as a function of processor activity. In this exemplary embodiment, processor core allocation system 122 can use one or more threads for each of a plurality of view modeling systems, and can allocate threads to processors for background model updating or other suitable purposes. The threads can also or alternatively be allocated for different view updates in parallel, one view at a time to have fewer half-finished caches when switching, or in other suitable manners.

Floor plan view cache 126 is a dedicated cache memory space for use by a floor plan modeling system. Floor plan view cache 126 can be allocated in cache system 102 at startup, such as based on a predetermined cache allocation for the floor plan modeling system, a dynamic cache allocation for predetermined system types, or in other suitable manners. In this manner, floor plan view cache 126 can have a size that is dynamically adjusted, fixed, or otherwise controlled. Likewise, floor plan view cache 126 can be de-allocated when a floor plan modeling system is closed, has not been activated or is otherwise not in use.

Schedule view cache 128 is a dedicated cache memory space for use by a schedule modeling system. Schedule view cache 128 can be allocated in cache system 102 at startup, such as based on a predetermined cache allocation for the schedule modeling system, a dynamic cache allocation for predetermined system types, or in other suitable manners. In this manner, schedule view cache 128 can have a size that is dynamically adjusted, fixed, or otherwise controlled. Likewise, schedule view cache 128 can be de-allocated when a schedule modeling system is closed, has not been activated or is otherwise not in use.

In operation, system 100 allows alternate views of a multi-view building modeling system to be updated in the background while an active view is available for modification by a user. In this manner, as the user implements changes to the active view, the changes are also implemented and stored in a cache memory for use in the alternate views, to allow the changes to be quickly reflected in the alternate view when the user activates the alternate view modeling system. Unused processor capacity of a multi-core processor can thus be utilized to speed up the implementation of changes in different views.

Figure 2:
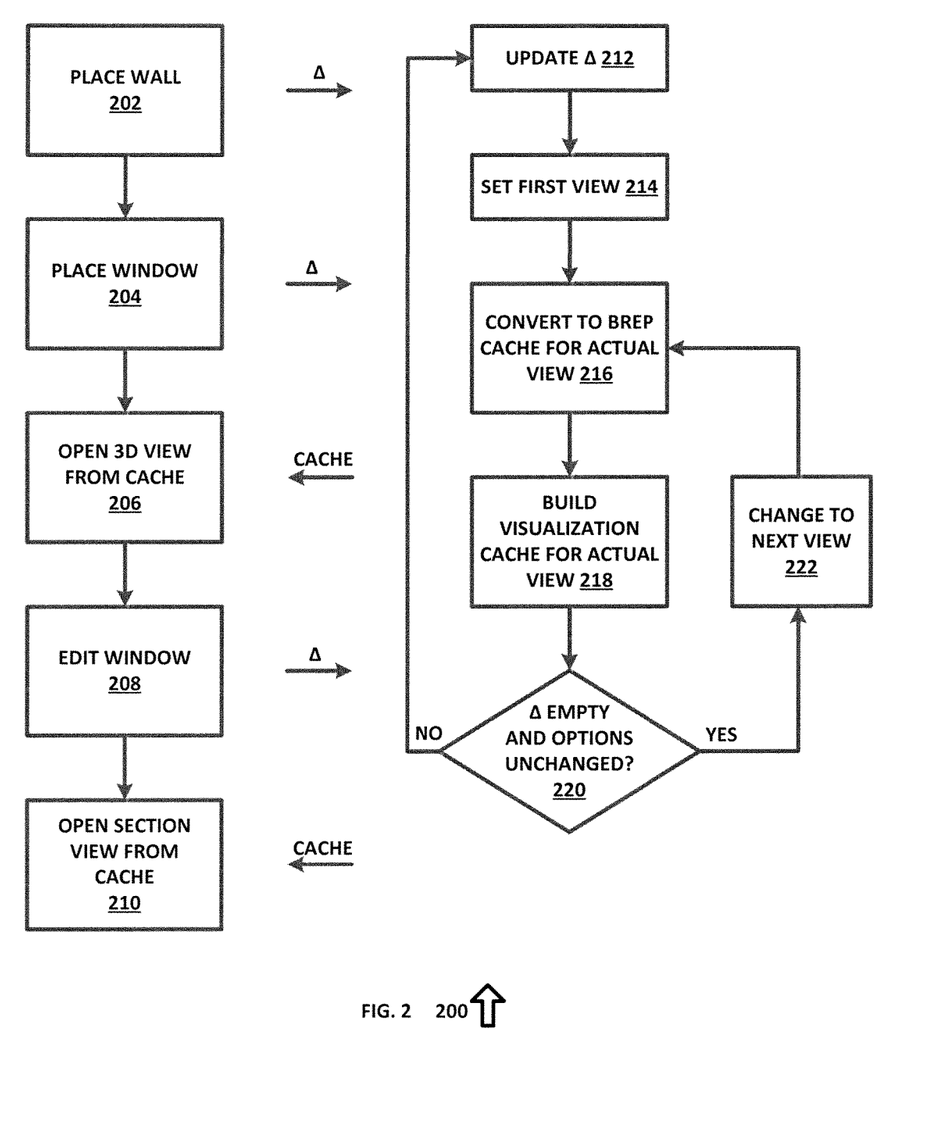
FIG. 2 is a diagram of an algorithm for predictive background updating, in accordance with an exemplary embodiment of the present disclosure.

FIG. 2 is a diagram of an algorithm 200 for predictive background updating, in accordance with an exemplary embodiment of the present disclosure. Algorithm 200 can be implemented in hardware or a suitable combination of hardware and software.

Algorithm 200 begins at 202, where a wall is placed in an elevation view modeling application. In one exemplary embodiment, the wall can be placed by selecting a wall component from a list of available components of a BIM system or in other suitable manners, where the location of the wall is selected by the user within a building model or in other suitable manners. In this exemplary embodiment, one or more algorithms can be utilized to display the available wall sections or wall characteristics, to allow the user to select a wall section or wall characteristics, to allow the user to place the wall section or assign the wall characteristics to selected coordinates, or to select or assign other suitable attributes to the wall, such as by using the ArchiCAD system available from Graphisoft of Budapest, Hungary or in other suitable manners.

In addition, as the user makes changes W to the elevation view model with the elevation view modeling subsystem, the changes are updated in the model at 212 as they are implemented by the user. The algorithm then proceeds to 214 where the first view is set, such as the most recently-used building modeling system. In one exemplary embodiment, a background updating process can be implemented that generates cached data for implementation in the most recently-used building modeling system when it is activated again. For example, if the elevation view modeling system is active and the previously-activated view modeling system is the layout view modeling system, the layout view modeling system can be set. The algorithm then proceeds to 216.

At 216, the changes made to the currently-selected (actual) view are implemented in a BREP cache. In one exemplary embodiment, the BREP cache can include BIM components that are shared between all building modeling views, to allow the different building modeling subsystems to be updated in the background when changes are made in any one of the separate building modeling system views. The algorithm then proceeds to 218.

At 218, a visualization cache is built for the actual view, such as the presently-selected prior view cache. In one exemplary embodiment, the visualization cache can be configured to be implemented in the previously-selected view as soon as it is selected or activated by the user, or in other suitable manners. In addition, as the visualization cache is built, the changes can be stored in static memory from dynamic memory, so as to allow the changes to be implemented in the future even if the user closes out the building modeling application without changing views. The algorithm then proceeds to 220.

At 220, it is determined whether all of the changes are empty and if any options are unchanged. If not, then the algorithm returns to 212, otherwise, the algorithm proceeds to 222 where the next previous view is selected. For example, if the user was previously using the layout view modeling subsystem and all changes have been implemented for that model, then the algorithm can select the view modeling system that was used prior to the layout view modeling system, such as a 3D modeling system, an interior elevation view modeling system, a 3D document modeling system or other suitable systems. The algorithm then returns to 216.

From 202, the algorithm proceeds to 204, where the user places a window in the building model from the elevation view active window. In one exemplary embodiment, the window can be placed by selecting a window component from a list of components of a BIM system or in other suitable manners, where the location of the window is selected by the user within a building model or in other suitable manners. In this exemplary embodiment, one or more algorithms can be utilized to display the available windows or window characteristics, to allow the user to select a window or window characteristics, to allow the user to place the selected window or assign the window characteristics to selected coordinates, or to select or assign other suitable attributes to the window. Likewise, as changes W are made, the algorithm implements 212 through 220 in the background, such as using one or more processor cores that have available processing capacity or in other suitable manners. The algorithm then proceeds to 206.

At 206, the user opens a 3D building modeling view from the cache. Any changes stored in the 3D building modeling cache from performing 212 through 220 are then implemented in the 3D building modeling view, as well as any additional changes that may be required for the view that were not completed in the background. The algorithm then proceeds to 208 where the window is edited in the 3D modeling view, and the changes are also implemented in the background in the most recent modeling view (e.g. elevation modeling), as well as any other previously-access models, such as the section view. The algorithm then proceeds to 210.

At 210, the section view model is opened from the cache memory, and any changes stored in the section modeling cache from 212 through 220 are then implemented in the section modeling view, as well as any additional changes that may be required for the view that were not completed in the background.

In operation, algorithm 200 allows changes that are made in an active window of a first building modeling tool to be implemented in the background for other building modeling tools, so that when the other building modeling tools are used to open an active window, the user does not need to wait for the previously-made changes to be implemented. Although algorithm 200 is shown as a flowchart algorithm, object oriented programming, state diagrams or other suitable programming paradigms can also or alternatively be used to implement algorithm 200. In addition, each individual process step of algorithm 200 is exemplary, and other suitable processes can be used as described herein to implement the algorithmic sub-processes of algorithm 200.

Figure 3:
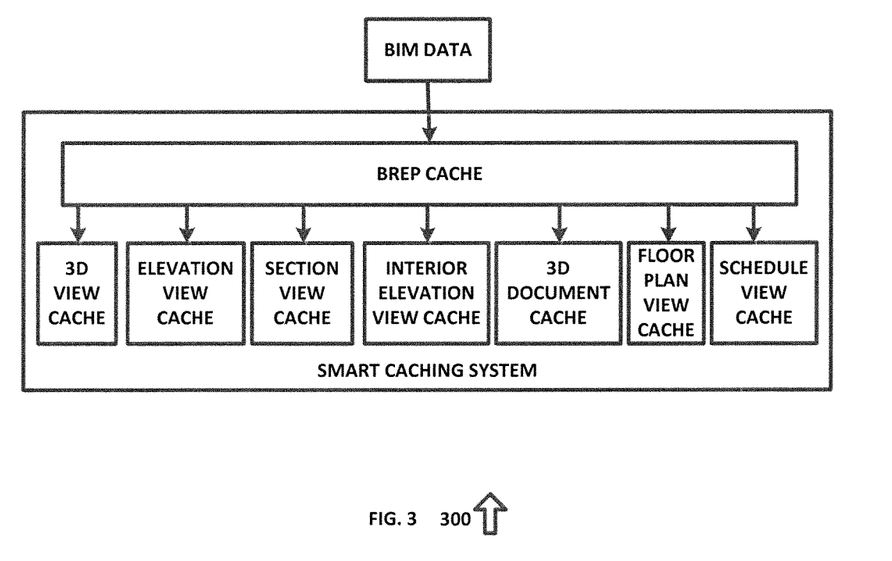
FIG. 3 is a diagram of a data flow, in accordance with an exemplary embodiment of the present disclosure.

FIG. 3 is a diagram of a data flow 300, in accordance with an exemplary embodiment of the present disclosure. In data flow 300, BIM data is provided to BREP cache of the smart caching system, and is then provided from BREP cache to 3D view cache, section view cache, elevation view cache, interior elevation view cache, 3D document cache, floor plan view cache, schedule view cache. In this regard, the data associated with each cache can be derived from the BIM data, such that the BIM data includes three dimensional coordinate data, schedule data and other suitable data. Other suitable configurations can also or alternatively be used, such as additional caches for different views that might be provided.

A system for background updating of multiple views of a building information model (BIM) is disclosed. The system includes a view system operating on a multi-processor system that is configured to allow a user to select one of a plurality of views in an active window, such as by using one or more algorithms to display a plurality of items or design features to a user, to allow the user to select one or more of the plurality of items or design features, to allow the user to place a selected item or design feature within a two or three dimensional building model or view, to edit the BIM components with an active window view using a first processor core of the multi-processor system, and to have one or more additional views enabled, each in a separate inactive window. The additional views can be associated with different modeling subsystems, which can be inactive while their associated windows are not selected by the user to be active. An update system operating on the processor is configured to update changes made to the view in the active window to the view in the one or more inactive windows using a second processor core of the multi-processor system, such as by using background processing when the user is not making changes to the active window or in other suitable manners.

The system can include a boundary representation (BREP) cache for a plurality of building information model (BIM) elements. The BIM elements in the BREP cache can each have associated data, such as data that identifies where the BIM element should be placed within the building model, characteristics of the BIM element, schedule data for the BIM element, cost data for the BIM element, construction activities associated with the BIM element, material data associated with the BIM element or other suitable data. A cache can be created or defined in a section of dynamic memory devices (such as random access memory devices associated with the processor that are allocated for use during operation of the processor and de-allocated after use of the processor) for the BIM elements present in the active window view, and a separate cache can be created or defined in the dynamic memory devices for the BIM elements in each inactive window view.

The system can further include an active window view cache BIM element and an inactive window view cache BIM element that are each associated to a single BIM element in the BREP cache. For example, an active window view for an associated modeling system (such as a software system or subsystem that has dedicated functionality for creating and editing an elevation model, a section model, a 3D model, an interior elevation model, a 3D document model, a floor plan model, a schedule model or other suitable models) can have an associated cache that is created or defined in dynamic memory devices that stores BIM elements that are in use in the active window view, and an inactive window view for a different associated modeling system can have an associated cache that is created or defined in dynamic memory devices that stores BIM elements that are in use in the in active window view, and each of the BIM elements in the active window view cache and the inactive window view cache can be associated with a BIM element in the BREP cache, such as by a relational database, a relational addressing scheme or in other suitable manners that generates a direct correlation in the data stored for the BIM element in the active view cache, the data stored for the BIM element in the inactive view cache and the data stored for the BIM element in the BREP cache, such as to ensure that the three different sets of data stored in the three different caches are identical. The same process can be used with each additional inactive view cache.

The system can further include one processor core of the multi-processor system that is dedicated for user interactions, such as by loading a program into one of the processor cores that causes that processor core to recognize user entries at or interactions with one or more data entry devices, and where each of the other processor cores of the multi-processor system is dedicated to updating one of the plurality of views, such as by updating the dynamic data caches associated with each inactive modeling system as a background process that is performed by each processing core when processor capacity is available for that processor core, such as when other systems of the multi-processor system that have a higher priority than the update process for the inactive windows are not using the processor core.

The system can further include configuring the update system (such as by providing one or more processor instructions that cause the processor to perform a predetermined operation) to update the changes made to the view in the active window to the view in a first inactive window of two or more inactive windows using the second processor core of the multi-processor system and to update the changes made to the view in the active window to the view in a second inactive window of the two or more inactive windows using a third processor core of the multi-processor system after completion of the updates to the first inactive window, wherein the first inactive window is a most recently used inactive window, and the second inactive window is the second most recently used inactive window. The sequence of previously used windows (each associated with a previously used modeling program or subprogram) can be stored, so as to allow each BIM data model or other associated model for each modeling program to be updated in the background in the reverse order of use, such that the most recently used modeling programs are updated before the least recently used modeling programs.

The system can further include configuring the update system to update the changes made to each of the caches for each of the inactive views by using a plurality of discrete processing jobs, such as where each processing job is associated with an element, a modeling system or with other suitable functionality, and where the changes made to the view in the one or more inactive windows are implemented in an associated cache that is incrementally built up by each of the series of discrete processing jobs.

The system can further include data stored in the associated cache that is stored in one or more dynamic memory devices during each of the discrete processing jobs, and that is also stored in one or more static memory devices after completion of each discrete processing job. For example, as each processing job is completed using the dynamic memory, the final data product can be stored to static or long term data memory, such as to allow the data to be restored from the static memory after a system disruption, a system shut down or for other suitable purposes.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for background updating of multiple views of a building information model (BIM), comprising:
   a view system operating on a multi-processor system and configured to allow a user to select one of a plurality of views in an active window and to edit the active window view using a first processor core of the multi-processor system, and to have one or more additional views enabled, each in a separate inactive window;
   an update system operating on the multi-processor system and configured to automatically update changes made to the view in the active window to the view in the one or more separate inactive windows using a dynamically selected second processor core of the multi-processor system;

a boundary representation (BREP) cache for a plurality of building information model (BIM) elements; and a cache for the active window view and a separate cache for each inactive window view, wherein the inactive window views are updated in a predetermined order and wherein an active window view cache BIM element and an inactive window view cache BIM element are each associated to a single BIM element in the BREP Cache.

2. The system of claim 1 wherein the BIM element stored in the BREP cache includes a separate associated BIM element for each of the plurality of views.

3. The system of claim 1 wherein one processor core of the multi-processor system is dedicated for user interactions and where each of the other processor cores of the multi-processor system is dedicated to updating one of the plurality of views.

4. The system of claim 1 wherein the update system is configured to update the changes made to the view in the active window to the view in a first inactive window of two or more inactive windows using the second processor core of the multi-processor system and to update the changes made to the view in the active window to the view in a second inactive window of the two or more inactive windows using a third processor core of the multi-processor system after completion of the updates to the first inactive window, wherein the first inactive window is a most recently used inactive window, and the second inactive window is the second most recently used inactive window.

5. The system of claim 1 wherein the update system updates the changes using a plurality of discrete processing jobs, and the changes made to the view in the one or more inactive windows are implemented in an associated cache that is incrementally built up by the discrete processing job.

6. The system of claim 5 wherein data stored in the associated cache is stored in one or more dynamic memory devices during each of the discrete processing jobs, and is also stored in one or more static memory devices after completion of each discrete processing job.

7. A non-transitory computer readable medium comprising a set of computer instructions executable by a multi-processor system for operating a system for modeling a building, the computer instructions configured to:

allow a user to select one of a plurality of views in an active window and to edit the active window view using a first processor core of the multi-processor system, and to have one or more additional views enabled, each in a separate inactive window;

continuously update changes made to the view in the active window to the view in the one or more separate inactive windows using a dynamically selected second processor core of the multi-processor system; and update the changes made to the view in the active window to the view in a first inactive window of two or more inactive windows using the second processor core of the multi-processor system and to update the changes made to the view in the active window to the view in a second inactive window of the two or more inactive windows using a third processor core of the multi-processor system after completion of the updates to the first inactive window, wherein the inactive window views are updated in a predetermined order, and wherein the first inactive window is a most recently used inactive window, and the second inactive window is the second most recently used inactive window.

8. The non-transitory computer readable medium as recited in claim 7 wherein the second processor is dynamically selected according to available capacity of one or more processor cores of the multi-processor system.

9. The non-transitory computer readable medium as recited in claim 8 wherein one processor core of the multi-processor system is dedicated for user interactions and where each of the other processor cores of the multi-processor system is dedicated to updating one of the plurality of views.

10. The non-transitory computer readable medium as recited in claim 7 wherein the second processor is dynamically selected according to one of:
processor code loading;
processor core loading; and
thread loading.

11. A system for background updating of multiple views of a building information model (BIM), comprising:

a view system operating on a multi-processor system and configured to allow a user to select one of a plurality of views in an active window and to edit the active window view using a first processor core of the multi-processor system, and to have one or more additional views enabled, each in a separate inactive window;

an update system operating on the multi-processor system and configured to automatically update changes made to the view in the active window to the view in the one or more separate inactive windows using a dynamically selected second processor core of the multi-processor system, wherein the update system is configured to update the changes made to the view in the active window to the view in a first inactive window of two or more inactive windows using the second processor core of the multi-processor system and to update the changes made to the view in the active window to the view in a second inactive window of the two or more inactive windows using a third processor core of the multi-processor system after completion of the updates to the first inactive window, wherein the inactive window views are updated in a pre determined order, wherein the first inactive window is a most recently used inactive window, and the second inactive window is the second most recently used inactive window.

12. The system of claim 11 further comprising a boundary representation (BREP) cache for a plurality of building information model (BIM) elements.

13. The system of claim 12, further comprising a cache for the active window view and a separate cache for each inactive window view.

14. The system of claim 13 wherein an active window view cache BIM element and an inactive window view cache BIM element are each associated to a single BIM element in the BREP Cache.

15. The system of claim 14 wherein the BIM element stored in the BREP cache includes a separate associated BIM element for each of the plurality of views.

16. The system of claim 11 wherein one processor core of the multi-processor system is dedicated for user interactions and where each of the other processor cores of the multi-processor system is dedicated to updating one of the plurality of views.

17. The system of claim 11 wherein the update system updates the changes using a plurality of discrete processing jobs.

18. The system of claim 17, wherein the changes made to the view in the one or more inactive windows are implemented in an associated cache that is incrementally built up by the discrete processing job.

19. The system of claim 18 wherein data stored in the associated cache is stored in one or more dynamic memory devices during each of the discrete processing jobs.

20. The system of claim 19 wherein data stored in the associated cache is also stored in one or more static memory devices after completion of each discrete processing job.

* * * * *

UNITED STATES PATENT AND TRADEMARK OFFICE
CERTIFICATE OF CORRECTION

PATENT NO. : 10,402,072 B2
APPLICATION NO. : 14/703655
DATED : September 3, 2019
INVENTOR(S) : András Belesik and Gyula Faller Page 1 of 1

It is certified that error appears in the above-identified patent and that said Letters Patent is hereby corrected as shown below:

In the Specification

Column 7, Line 23, delete "W" and insert -- ($\Delta$) --, therefor.

Column 8, Line 14, delete "W" and insert -- ($\Delta$) --, therefor.

Signed and Sealed this
Tenth Day of December, 2019

Andrei Iancu
*Director of the United States Patent and Trademark Office*